RECORDING APPARATUS AND MEDIUM WITH DISCRETE LEVEL MODULATION

Filed March 19, 1964 3 Sheets-Sheet 1

INVENTOR.
PETER C GOLDMARK
BY Brumbaugh, Free, Graves & Donohue
his ATTORNEYS

INVENTOR.
PETER C. GOLDMARK
BY Brumbaugh, Free Graves & Donohue
his ATTORNEYS

INVENTOR.
PETER C. GOLDMARK
BY Brumbaugh, Free, Graves & Donohue
his ATTORNEYS 3,354,264

RECORDING APPARATUS AND MEDIUM WITH DISCRETE LEVEL MODULATION

Peter C. Goldmark, Stamford, Conn., assignor to Columbia Broadcasting Systems, Inc., New York, N.Y., a corporation of New York Filed Mar. 19, 1964, Ser. No. 353,197
32 Claims. (Cl. 178—5.4)

This invention relates to a recording medium and to apparatus for recording in transverse lines spaced along such medium. More particularly, this invention relates to apparatus and media of such sort wherein the information which is recorded is in the form of a carrier modulated in a time characteristic such as frequency or phase.

During playback, the means which scans the medium may happen to straddle two lines of recorded information. In the past, the result of such straddling has been the creation of an undesirably high level of interference or "cross talk" in the signal derived from the scanning. The interference has been produced because the cyclical variations of the modulated carrier which are recorded in one straddled line have had a random spatial distribution in relation to the cyclical variations recorded in the other straddled line. To avoid such interference, it has previously been necessary to minimize the possibility of line-straddling by providing very accurate tracking between the scanning means and the lines scanned thereby. Moreover, it has often been necessary to further provide relatively wide guard bands between successive recorded lines.

In accordance with the present invention, the described interference is greatly reduced by imparting to the carrier a rest frequency equal to an integral multiple of the line scan frequency, and by modulating stepwise (i.e. to discrete levels) the time characteristic in respect to which the carrier is varied by the modulating signal. When such a modulated carrier is recorded in successive transverse lines spaced along a medium, an ordered relationship results between the spatial distributions in adjacent lines of the carrier variations recorded therein. Because of such ordered relationship, only a relatively small amount of interference between lines can be produced even if, during playback, the scanning means straddles two lines to a lesser or greater extent. Therefore, the present invention eliminates the necessity for wide guard bands between recorded lines and for close tracking of those lines by the scanning means.

While recording on film is specifically described herein, the invention is also applicable to recording on other media such as video magnetic tape. Moreover, while the practice of the invention is specifically described herein in connection with a frequency-modulated carrier, the invention is also applicable when the carrier is modulated in a time characteristic other than frequency as, for example, when the modulation is phase modulation, pulse rate (frequency) modulation or pulse phase modulation.

For a better understanding of the invention, reference is made to the following description of representative embodiments thereof and to the accompanying drawings wherein.

Figure 1:
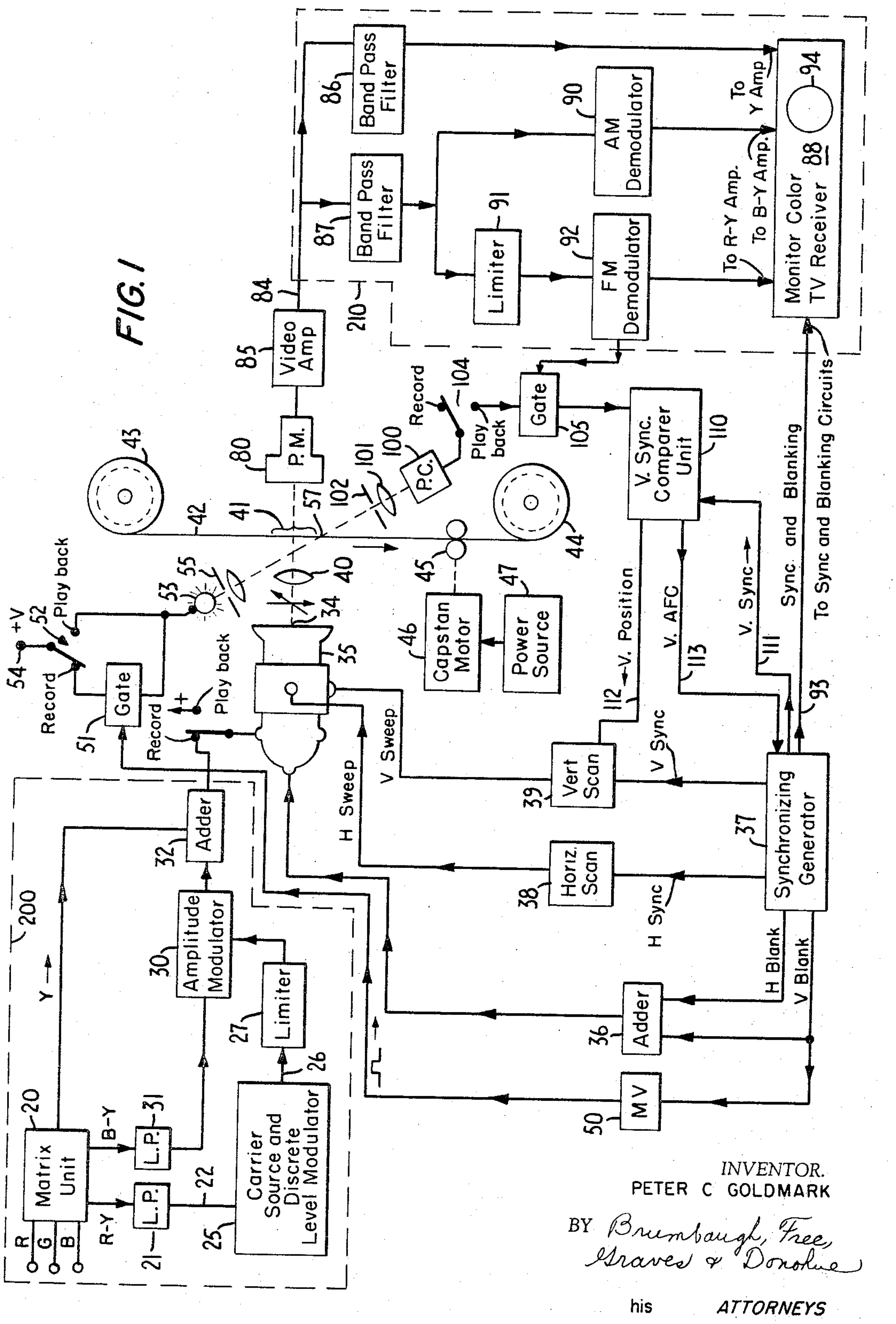
FIG. 1 is a block diagram of a recording-reproducing system embodying the present invention.

Referring now to FIG. 1, a standard matrix unit 20 receives red, green and blue electrical signals representing the corresponding color components of a picture image provided by a live color television program or by a color cinematographic film. The unit 20 converts the red, green and blue signals into a Y luminance signal of 0–3.6 megacycles bandwidth and into two chrominance signals, namely, a $R-Y$ (red minus luminance) signal and a $B-Y$ (blue minus luminance) signal. Each of the chrominance signals is characterized by a numerically continuous variation in amplitude over a range between zero and normal maximum value.

The $R-Y$ signal is passed from unit 20 through a low pass filter 21 which restricts the bandwidth of the signal to 0–0.5 megacycle. Thereafter, the $R-Y$ signal is fed via lead 22 to a unit 25 designated in FIG. 1 as a carrier source and discrete level modulator. Unit 25 includes source means of a carrier having a rest frequency which is an integral multiple of the horizontal line scan frequency (15,750 cycles per second) characterizing the conventional television signal. Also included in unit 25 is means responsive to the numerically continuous variation of the $R-Y$ signal to frequency modulate the carrier to successive discrete levels of deviation.

More specifically, when the $R-Y$ signal has an amplitude of zero, the carrier has a rest frequency or zero deviation level $f_0$ of 4.50450 megacycles, such frequency value being equal to the line scan frequency $f_L$ of 15,750 cycles per second multipled by the integer 286. As $R-Y$ changes in a numerically continuous manner from zero amplitude $V_0$ to maximum normal amplitude $V_M$, the frequency of the carrier is modulated to successive discrete modulation deviation levels of which each is separated from the next by a frequency interval of $f_L$. The first of those levels is $f_1$ equal to $f_0-f_L$ or 4.48875 megacycles, the second level is $f_2$ equal to $f_0-2f_L$ or 4.47300 megacycles, and so on. The last modulation level of deviation $f_{24}$ is equal to $f_0-24f_L$ or 4.12600 megacycles, i.e., is spaced from the rest frequency $f_0$ by 378 kilocycles which is the maximum deviation of the carrier. That maximum deviation is less than the 0.5 megacycle bandwidth of the $R-Y$ signal. Hence, the frequency modulation of the carrier is of the narrow or small swing type.

Each of the twenty-five deviation levels $f_0$ to $f_{24}$ is produced for any $R-Y$ amplitude within a specific amplitude range which corresponds to that level and which is one of twenty-five successive ranges $r_0$ to $r_{24}$ occupying the $R-Y$ amplitude interval extending between $V_0$ and $V_M$. That is, the zero deviation level $f_0$ is produced by all amplitudes of the $R-Y$ signal within an $R-Y$ amplitude range $r_0$ extending between zero amplitude and an upper value which is a predetermined percentage of $V_m$. Similarly, the first deviation level $f_1$ is produced by all amplitudes of the $R-Y$ signal lying within the next successive range $r_1$, such range $r_1$ being bounded by lower and upper $R-Y$ amplitude values which are each a predetermined percentage of $V_m$. A like relationship exists between the deviation levels of higher number than $f_1$ and the corresponding $R-Y$ amplitude ranges of higher number than $r_1$.

The last amplitude range $r_{24}$ is nominally bounded at its upper end by the normal maximum amplitude $V_m$ for the $R-Y$ signal. In practice, however, the $r_{24}$ range is open at its upper end in that an $R-Y$ amplitude greater than $V_m$ is operable to deviate the carrier to and only to the maximum deviation level $f_{24}$.

The successive $R-Y$ amplitude ranges may be either equal or unequal in size. As later explained, those ranges may be either non-overlapping or overlapping. The number of discrete deviation levels and of corresponding amplitude ranges may be varied, although perferably (but not necessarily) the number of levels should not be so many as to produce a maximum deviation greater than the highest modulating frequency of the modulating signal. As later described in more detail, the size of the frequency intervals between deviation levels may vary by steps of which each equals $f_L$. Thus, for example, the levels near $f_0$ may be separated by intervals equal to $2f_L$, whereas the levels near $f_{24}$ may be separated by intervals equal to $f_L$. If desired, the practice in color television may be followed of making the horizontal line scanning frequency $f_L$ equal to 15,734.26 cycles per second. If such is done, the carrier rest frequency $f_0$ (which is equal to 286 $f_L$) becomes exactly 4.5 megacycles.

The frequency modulated carrier is supplied from unit 25 and is passed via lead 26 through a limiter 27 and then to an amplitude modulator stage 30. Within stage 30, the carrier is amplitude modulated by the $B-Y$ signal which is fed from matrix unit 20 to stage 30 through a low pass filter 31 restricting the bandwidth of the $B-Y$ signal to 0–0.5 megacycle. The frequency and amplitude modulated carrier from stage 30 is combined in an adder stage 32 with the Y luminance signal from matrix unit 20.

Figure 2:
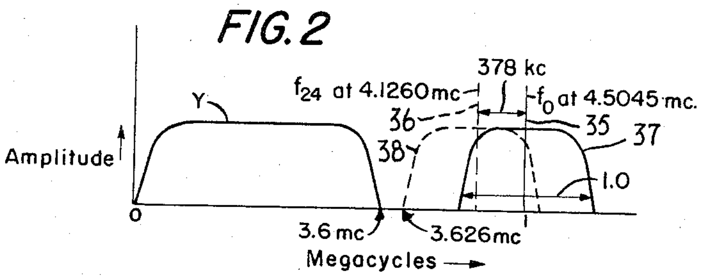
FIG. 2 is a bandwidth diagram of certain of the signals characterizing the system of FIG. 1.

FIG. 2 is a diagram of the bandwidth relations of the components of the combined signal at the output of adder 32. As shown, the Y luminance signal occupies a bandwidth of 0–3.6 megacycles. The chrominance signal when undeviated is at 4.5045 megacycles and when maximally deviated by 378 kilocycles is at 4.1260 megacycles, those two frequency values being indicated by, respectively, the solid vertical line 35 and the dotted vertical line 36. For a very small frequency deviation, all of the significant AM and FM chrominance side bands lie within the region 37 which is centered about the rest frequency $f_0$, and which has a bandwidth of 1.0 megacycle equal to twice the 0.5 megacycle bandwidth of each of the $B-Y$ and $R-Y$ modulating signals. As, however, the deviation increases to its maximum value of $f_{24}$, at least the FM side bands of significance tend to spread out to occupy a frequency interval to either side of $f_0$ which is greater than 0.5 megacycle. This spreading out of the side bands is represented in FIG. 2 by a side band region 38 (of 1.0 megacycle bandwidth) which is centered on $f_{24}$, and within which accordingly, some of the side bands are spaced from $f_0$ by more than 0.5 megacycle. While side band region 38 is not in all respects an accurate depiction of the distribution of the significant side bands produced at the maximum deviation of the carrier, the region 38 does properly represent that, in this instance where the maximum deviation is less than the greatest modulating frequency, there are no chrominance side bands of practical significance below 3.626 megacycles, i.e., below a frequency value which is separated from $f_0$ by an interval equal to the maximum deviation plus the maximum frequency by which the carrier is modulated. Accordingly, the luminance signal and the chrominance signal (carrier plus side bands) are wholly separable during playback by appropriate filters.

The output of adder stage 32 is supplied to the grid of a cathode ray tube 35 to intensity modulate the tube beam. The cathode of tube 35 is supplied from an adder stage 36 with horizontal and vertical blanking pulses fed to that stage from a conventional television synchronizing generator 37 which also supplies with synchronizing signals the cameras providing the red, green and blue signals to matrix 20. The horizontal and vertical synchronizing pulses from generator 37 are received by, respectively, a horizontal scanning circuit 38 and a vertical scanning circuit 39. Circuit 38 develops a sawtooth horizontal sweep voltage at the conventional horizontal line scan frequency of 15,750 cycles. Circuit 39 develops a sawtooth vertical sweep voltage at the television field frequency of 60 cycles per second. The horizontal and vertical sweep voltage are applied to, respectively, the horizontal and vertical deflection electrodes of tube 35 to produce a raster scan over the screen of the tube of a luminous flying spot 34 developed on that screen by the intensity modulated tube beam. That flying spot sweeps out 60 fields (30 frames) per second on the screen of the tube.

An optical system 40 produces a focused image of the flying spot at a recording zone 41 in the path for a photographic film strip 42 extending between a supply reel 43 and a take-up reel 44. The film strip 42 is sprocketless and is moved downwardly at substantially constant speed by a capstan 45 driven by a capstan motor 46 energized from a power source 47 which may be a 60 cycle A.C. power line. The motor 46 may be a synchronous motor.

Each field swept out by the raster scan of tube 35 is recorded as a field 60 on film 42 in a manner resembling the film scanning technique described in copending application Serial No. 268,911 filed Mar. 29, 1963 in the name of Bernard Erde and owned by the assignee hereof. That is, the raster scan of tube 35 has twice the dimension in the vertical direction as each field recorded on the film, and the downward vertical velocity of the scanning spot is twice the downward velocity of the film. Each field as recorded on the film has a lesser height/width aspect ratio than a conventional television frame because the lines of the field are only half as many as those of a frame and, hence, can be closed up to occupy a lesser height. Further, the individual recorded lines on the film may be anamorphosed in the sense that the vertical dimension of each is compressed in relation to the vertical dimension of a line of the same length in a conventional television picture.

The recorded fields on film strip 42 are separated by vertical intervals produced by the vertical blanking pulses at the cathode of tube 35. A synchronizing mark is recorded in each of those vertical intervals in accordance wtih the teaching of my co-pending application Ser. No. 187,035 filed Apr. 12, 1962, and in a manner as follows. The leading edge of each vertical blanking pulse from generator 37 triggers a one-shot multivibrator 50 to develop a square wave having a duration less than the time interval between such leading edge and the leading edge of the ensuing vertical sync. pulse. The square wave is supplied as an "on" gating signal to gate 51 connected (during recording only) by a switch 52 between a flashable light source 53 and the power supply 54 for that source. While gate 51 is rendered "open" by the square wave, the light source 53 is energized from source 54 to produce a pulse of light which passes through a slit aperture 55. An image of that slit aperture is projected by an optical system 56 to illuminate an area 57 (FIG. 4) in the vertical interval on the film 42 between the last recorded field and the field which was previously recorded. If desired, the light source 53 may be continuously illuminated and the square wave applied to "open" a Kerr cell shutter (not shown) between source 53 and aperture 55. Moreover, if desired the area 57 may be disposed between the field last recorded and the field next to be recorded.

The effect of the illumination of such area 57 is to produce on the film 42 a synchronizing mark or bar 58 which appears as a white bar on a black background in the positive print of the film. The duration of the light pulse from light source 53 and the vertical dimension of area 57 are so correlated with the downward velocity of film 42 that the lagging edge of the white bar 58 is separated by a substantial interval 59 of black background from the field directly above, and, further, is positioned well within area 57 at the time the vertical sync. pulse begins. The manner in which each bar 58 is used for synchronizing is explained in the course of the description hereinafter of the operation of the FIG. 1 system during playback.

While the video information is recorded on film 42 by tube 35, the audio program which accompanies the video information is recorded in a longitudinal magnetic stripe or track 61 on the film by an audio system (not shown) which may be substantially similar to that disclosed in my aforementioned copending application.

Figure 3:
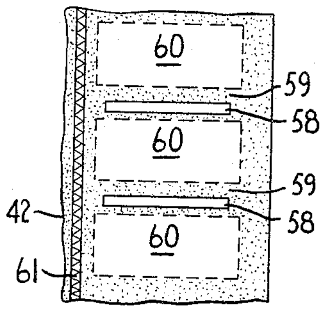
FIG. 3 is a view of a section of the film strip used in the FIG. 1 system and of the information recorded on that strip.
Figure 4:
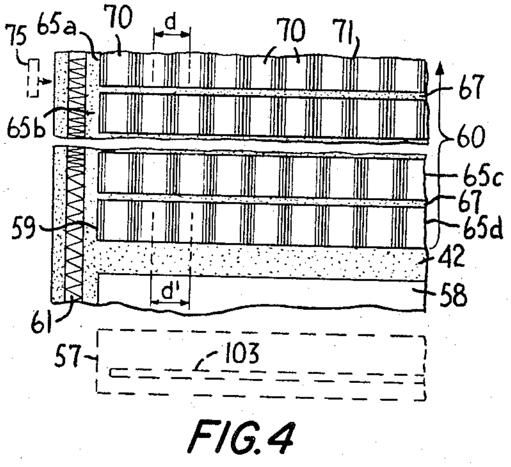
FIG. 4 is an enlarged view of a portion of the film strip section of FIG. 3.

FIG. 3 illustrates a section of the film strip 42, the section having thereon a succession of recorded fields 60 and intervening synchronizing bars 58. FIG. 4 is an enlarged view of a portion of the FIG. 3 section which includes the bottom left-hand corner of one of the fields 60 and the bar 58 which is below that field.

Each recorded field 60 on film 42 is comprised (FIG. 4) of a succession of recorded information-bearing lines or strips 65 extending transversely over the film and spaced longitudinally therealong. Of the 262½ lines which make up one field, only the lines *65a*, *65b*, *65c* and *65d* are shown in FIG. 4.

Each of the recorded lines on film 42 is characterized over its length by a variation in the tone density of the film which corresponds to the variation in amplitude of the Y luminance signal during the period within which the line was recorded. That luminance tone density variation has, for clarity, not been depicted in the lines shown by FIG. 4.

Each of the recorded lines also contains a multicycle variation in tone density which corresponds to the instantaneous variation in amplitude of the chrominance modulated carrier during the period within which the line was recorded. While, as described, the carrier is not only frequency modulated but is, as well, amplitude modulated to produce a variation in the tone density range between the points of minimum and maximum tone density in the recorded variation, the effect caused by the amplitude modulation has, again for clarity, not been depicted in FIG. 4. What FIG. 4 does illustrate is the transverse spatial relationship in each recorded line of the carier cycles recorded in that line.

The multicycle variation in line or strip *65a* is produced when the R—Y signal has zero amplitude, and when, accordingly, the chrominance carrier is at its rest frequency $f_0$. In that multicycle variation, the alternating light areas 70 and dark areas 71 correspond (in a positive print) to, respectively, the positive-going half cycles and the negative-going half cycles of the chrominance carrier. It follows that the distance $d$ in strip *65a* between the centers of two adjacent light areas 70 (or between the centers of two adjacent dark areas 71) is the spatial equivalent of one time cycle of the carrier.

Because the carrier remains at $f_0$ during the recording of line *65a*, the strip distance per cycle $d$ remains of constant value throughout that line. Any series in a recorded line or strip of consecutive tone density cycles for which $d$ is constant is referred to herein as a "train." It follows that the multicycle variation of strip *65a* consists entirely of one such train.

As earlier described, the carrier rest frequency $f_0$ is so related to the horizontal line scan frequency $f_L$ that exactly 286 cycles of the carrier at $f_0$ occur during one full horizontal scan cycle. If the scanning beam of tube 35 were to sweep at constant speed in one direction over one such full scan cycle, the beam would sweep out a reference distance equal to its scanning velocity multiplied by the period of that cycle. Since the carrier undergoes 286 cycles during such period, the strip distance $d$ is equal to that reference distance divided by the integer 286.

The multicycle tone density variation in the line *65b* is a recording of the chrominance carrier while at its rest frequency $f_0$. Thus, such multicycle variation is similar to that in line *65a* in that it likewise consists wholly of a train of single cycle variations of which the number is the same as in line *65a* (because lines *65a* and *65b* are of the same length), and for which the strip distance $d$ is constant and of the same value as in line *65a*. Further, because the frequency $f_0$ of the carrier recorded in lines *65a* and *65b* is an integral multiple of the line scan frequency $f_L$, the single cycle variations in line *65b* have a space-phase relative to the left-hand edge of that line which is the same as the space-phase of the single cycle variations in line *65a* relative to the left-hand edge of line *65a*. Therefore, because the lines *65a* and *65b* are horizontally coextensive, the train of single cycle variations in line *65b* is in transverse registration with the longitudinally spaced train of single cycle variations in line *65a*.

Assume for a horizontal line scan during playback that the image of the scanning spot of tube 35 is vertically positioned at 75 (FIG. 4) so as to straddle lines *65a* and *65b*. In such instance, the signal reproduced from the scanning can be considered to be the resultant of a first signal derived from line *65a* and a second signal derived from line *65b*. Each of such first and second signals is, however, of the same frequency and phase. Therefore, the resultant is also of that frequency and phase and is not significantly different from the signal which would be derived by scanning only one of such lines.

Lines *65c* and *65d* contain respective multicycle tone density variations of which each is a record of the chrominance carrier when deviated by the $R-Y$ signal to a frequency $f_n$ which is one of the discrete deviation levels $f_1$ to $f_{24}$. Each of those multicycle variations consists wholly of one train of single cycle variations having a strip distance per cycle $d'$ which is constant within any train and is of the same value for the two trains and is equal to the mentioned reference distance divided by an integer, namely 286–$n$. Hence, as before the lighter and darker areas of the train in line *65c* are in transverse registration with, respectively, the lighter and darker areas of the train in line *65d*. It follows that, as previously explained, the modulated chrominance carrier reproduced during playback is not adversely affected if the image of the reproducing scanning spot should happen to straddle lines *65c* and *65d*.

Inasmuch as the carrier frequency $f_n$ recorded in lines *65c*, *65d* is less than the carrier frequency $f_0$ recorded in lines *65a*, *65b*, the distance $d'$ is greater than the distance $d$. Hence, if the lines *65b* and *65c* are adjacent lines straddled during playback by the image of the scanning spot, the chrominance signal reproduced by the scanning would be the resultant of a first signal (from line *65b*) at a frequency $f_0$ and a second signal (from line *65c*) at a frequency $f_n$. Two signals of such sort will interact to produce a beat frequency $f_0$–$f_n$ in the resultant signal. In most scanning situations, however, the effect of the beat frequency is largely unnoticeable either in the $R-Y$ component of the reproduced picture image or in the $B-Y$ component thereof.

A particular advantage of producing the described transverse registration between longitudinally adjacent line recordings of the carrier at one frequency is that the amplitude of the signal reproduced by a scanning which straddles those recordings is approximately the same as the amplitude of the signal reproduced by a scanning of only one line. Therefore, a line scanning which straddles two such recordings does not seriously degrade the amplitude modulation on the carrier by which the $B-Y$ chrominance component is represented in the reproduced signal.

The FIG. 4 view of the film strip is idealized in that each of the multicycle variations in lines 65*a*–65*d* consists of just one train of single cycle variations of which the strip distance per cycle is constant for every cycle. In practice, because the frequency of the modulated carrier switches rapidly from one discrete level to another, many of the recorded lines each contain a number of such trains wherein the strip distance per cycle is constant within any train but differs from train to train in the same line or in different lines. In every train, however, the distance occupied along a recorded line by any one cycle of tone density variation is equal to the mentioned reference distance divided by the same integer as that which is multiplied by the line scan frequency $f_L$ to give the instantaneous carrier frequency which is represented by the recorded variation.

The FIG. 4 view should not be taken as being quantitatively accurate in the dimensioning shown thereby. The view does, however, properly indicate that the guard bands 67 between the recorded lines 65 have a vertical dimension which is less than half that of the lines. Since those guard bands are not needed during playback to prevent line straddling by the scanning spot, the guard bands are preferably reduced to the minimum width which safeguards against overlapping of the lines during recording. Not only does such reduction in guard band width save space on the film, but, in addition, the reduction is desirable because it better assures that the signal reproduced from a line-straddling scanning will approximate in amplitude the signal which would be reproduced if only one line were scanned. In fact, since the problems caused by a line-straddling reproducing scan have been largely eliminated by the present invention, the guard bands 67 may be eliminated altogether.

The right-hand section of the FIG. 1 system is the reproducing section and is inoperable during recording. During playback, a transparency of film 42 is drawn as before through zone 41 by the action of the capstan motor 46. Simultaneously, the cathode ray tube 35 produces a raster scan over its screen by a luminous spot of constant intensity. The image of the spot is projected to zone 41 to successively scan each of the fields 60 recorded on the transparency.

The light from the image which passes through the transparency is modulated in intensity in accordance with the scanned instantaneous transmissivity of the transparency. Such light is then converted into an electric signal by a photomultiplier 80 which views the zone 41. The reproduced signal is comprised of the Y luminance signal and of the chrominance carrier as amplitude modulated by the $B-Y$ chrominance component and as frequency modulated to discrete deviation levels by the $R-Y$ chrominance component.

The photomultiplier signal is transferred through a video amplifier 85 and is then separated into the Y signal and into the modulated carrier by a pair of bandpass filters 86 and 87 of which 86 selectively passes the Y signal and 87 selectively passes the carrier. The Y signal at the output of filter 86 is fed directly to the Y luminance amplifier of a monitor color television receiver 88 which has the usual video, synchronizing and blanking circuits. The R.F. circuits of receiver 88 are either by-passed or are not present.

The amplitude and frequency modulated chrominance carrier at the output of filter 87 is split into two portions of which one is fed through an amplitude demodulator stage 90 to recover the $B-Y$ signal which is then applied directly to the $B-Y$ amplifier of receiver 88. The other portion of the modulated carrier is fed through a limiter 91 to an FM demodulator stage 92 which may be a conventional ratio detector or Foster-Seely discriminator. The stage 92 recovers the $R-Y$ signal which is applied to the $R-Y$ amplifier stage of receiver 88.

The receiver 88 also receives synchronizing and blanking signals (via lead 93) from the synchronizing generator unit 37. The raster scans of tube 35 and of the picture reproducing tube 94 (in receiver 88) are synchronized with the presentation in zone 41 of the recorded film fields 60 in a manner as follows. During playback, the switch 53 is thrown to energize light source 53 to continuously illuminate area 57 (FIG. 4). That area is viewed by a photocell 100 through an optical system 101 and through an aperture 102. Aperture 102 restricts the portion of area 57 seen by the photocell to a transverse slit area 103 (FIG. 4) of smaller vertical dimension than area 57. The slit area 103 is so positioned that the lagging edge of each white bar 58 passes through the slit area at the time at which the leading edge of the vertical sync. pulse should be generated in order to maintain the raster scans of tubes 35 and 94 in synchronism with the vertical motion and instantaneous vertical positioning of the field 60 which is next to be scanned by tube 35.

As the lagging edge of bar 58 passes through slit area 103, the light received by photocell 100 changes abruptly from the high intensity provided by the white bar to the low intensity provided by the relatively dark background 59. Such change in light intensity develops from photocell 100 an electric signal pulse applied during playback through a switch 104 to a gate 105.

Gate 105 is normally non-conductive but is rendered conductive by a signal generated in FM demodulator stage 92 in response to the detection thereby of the absence of the chrominance carrier. Since the chrominance carrier will be present in that stage whenever tube 35 is scanning a field 60, the gate cannot conduct while a field is being scanned. Hence, the gate blocks passage beyond itself of a pulse from photocell 100 which is extraneous in the sense that the pulse is generated by a tonal gradation in a scanned field rather than by the tonal gradation between the lagging edge of a white synchronizing bar and the dark film background which is contiguous with that edge.

When the gate 105 is rendered conductive, the synchronizing pulse produced by bar 58 and photocell 100 is fed through the gate to a vertical synchronization comparer unit 110 comprised of synchronization correction circuits which may be similar to those utilized in the system of my aforementioned copending application. Besides the pulse from gate 105, the unit 110 also receives from synchronization generator unit 37 (via lead 111) the vertical sync. pulse which is generated thereby. The unit 110 responds to any difference between the respective times of occurrence of the pulse from gate 105 and of the leading edge of the pulse from unit 37 to produce the following:

(a) A first error signal supplied by lead 112 to the vertical scan circuit 39 to adjust the DC level, duration and rate of voltage change of the vertical sweep voltage so as to render the scanning spot of tube 35 coincident in vertical position at the beginning and end of each raster scan with, respectively, the top line and the bottom line of the field 60 being scanned;

(b) A second slower-acting error signal supplied by lead 113 to unit 37 to render the vertical sync. pulses developed by that unit of the same repetition frequency as the synchronizing pulses generated by photocell 100;

(c) If necessary, a third error signal supplied by lead 114 to the horizontal scan circuit 38 to adjust the duration and rate of voltage change of the horizontal sweep voltage in proportion to any correction made in the repetition frequency of the vertical sync. pulses generated by unit 37.

If desired, error signals may also be supplied via connections (not shown) to the receiver 88 to adjust the duration and rate of voltage change of each of the horizontal and vertical sweep voltages for tube 94, the adjustment being in proportion to any correction made by unit 110 in the repetition frequency of the vertical sync. pulses generated by unit 37.

The FIG. 1 system thus provides any synchronization which is needed because of a departure during playback in the downward velocity and/or instantaneous position of a recorded field 60 relative to the velocity and position characterizing that field when being recorded. Because, however, the image of the reproducing scanning spot can straddle adjacent recorded lines with little adverse effect on the quality of the reproduced color picture image, the synchronization correction need not be as accurate as what would be required if it were necessary for the spot to have an exact longitudinal registration with each recorded line.

Figure 5:
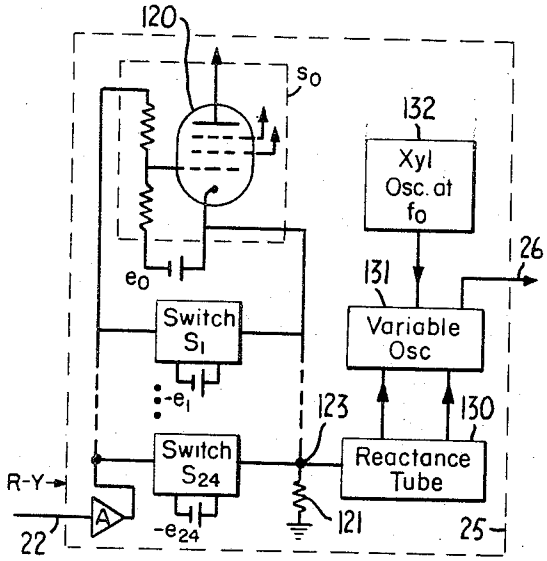
FIG. 5 is a schematic and block diagram of one embodiment of the stage of the FIG. 1 system which incorporates the carrier source means and the discrete level modulator.

FIG. 5 illustrates a circuit suitable for use as the discrete level modulator unit 25 of FIG. 1. In the FIG. 5 circuit, the $R-Y$ modulating signal is amplified and is then applied to the input of each of twenty-five switches of which there is one for each of the carrier frequencies $f_0$–$f_{24}$, but of which only the switches $S_0$, $S_1$ and $S_{24}$ are shown.

The switch $S_0$ is comprised of a pentode 120 (or other constant current device) having a control grid receiving the $R-Y$ signal and biased by a negative voltage $e_0$ so that the pentode becomes conductive only when the amplitude of the $R-Y$ signal rises from zero to 0.04 of $V_m$, the maximum normal amplitude for $R-Y$. The other switch units are similarly constructed but have successively greater negative biasing voltages, wherefore an $R-Y$ voltage of 0.08 $V_m$ is needed to fire the pentode of $S_1$, and so on. The cathodes of all the pentodes in the FIG. 5 circuit are connected to ground through a common resistor 121 having an upper terminal 123.

Figure 6:
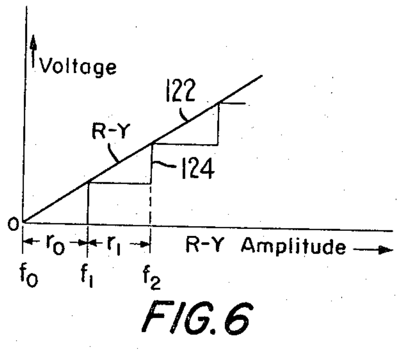
FIG. 6 is a graph illustrative of the operation of the FIG. 5 stage.

In FIG. 6 the line 122 represents a numerically continuous increase from zero towards $V_m$ in the amplitude of the $R-Y$ signal. When $R-Y$ reaches 0.04 $V_m$, the switch $S_0$ fires to pass one unit of current through the resistor until $R-Y$ reaches 0.08 $V_m$ when switch $S_1$ fires to increase to two units the amount of current through the resistor. As the $R-Y$ signal continues to increase in amplitude, the other switches fire in succession to produce successive increases in one unit steps of the current through the resistor. Thus, at the upper terminal 123 of resistor 121, the numerically continuous variation of the $R-Y$ signal is converted into a step by step voltage, wherefore the described portion of the FIG. 5 circuit acts as a means to quantize the overall amplitude variation of that signal. The resistor 121 has a resistance low enough to permit compensation for the effect of the voltage across the resistor on the biasing of the pentodes in the various switches.

The step by step voltage at terminal 123 is supplied to a reactance tube 130 which controls the oscillation frequency of a variable oscillator 131 stabilized at the carrier rest frequency $f_0$ by a crystal oscillator 132. When the amplitude of the input $R-Y$ signal is in the range $r_0$ (from 0.00 $V_m$ to 0.004 $V_m$), the output of the oscillator 131 is the chrominance carrier at its rest frequency $f_0$. When, however, the amplitude of the input $R-Y$ signal is in the range $r_1$ (from 0.04 $V_m$ to 0.08 $V_m$), the first voltage step then developed across resistor 121 causes reactance tube 30 to act on oscillator 131 to pull the frequency of its carrier output down to the deviation level $f_1$. Similarly, each further voltage step developed across resistor 121 causes the carrier output from oscillator 131 to be frequency modulated to a further one of its discrete deviation levels. Hence, the $R-Y$ signal is adapted by the FIG. 5 circuit to frequency modulate the carrier in steps.

Figure 7:
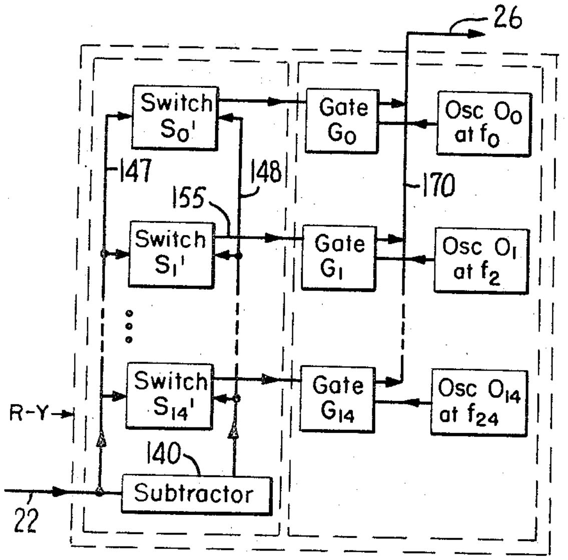
FIG. 7 is a block diagram of another embodiment of the said stage of the FIG. 1 system.

FIG. 7 illustrates another circuit suitable for use as the discrete level modulator 25 of FIG. 1. In the FIG. 7 circuit, the "direct" $R-Y$ signal on lead 22 is applied to the input of each of fifteen switches of which the switches $S_0'$, $S_1'$ and $S_{14}'$ are shown. Also applied to each of those fifteen switches is an "inverse" $R-Y$ signal produced from the input signal by a subtractor stage 140, the inverse signal having the amplitude value $V_m$–V where V is the amplitude at any time of the direct $R-Y$ signal.

Figure 10:
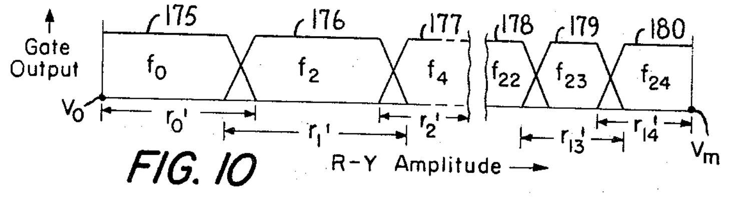
FIG. 10 is a graph illustrative of the overall operation of the FIG. 7 stage.

The fifteen switches of the FIG. 7 circuit correspond to fifteen amplitude ranges occupying successive positions in the overall amplitude range from $V_0$ to $V_m$ of the $R-Y$ signal. As shown by FIG. 10, the amplitude ranges near $V_0$ (i.e., ranges $r_0'$, $r_1'$, $r_2'$ etc.) are larger in extent than the amplitude ranges near $V_m$ (i.e., ranges $r_{14}'$, $r_{13}'$, etc.). Moreover, while there is a frequency interval of only $f_L$ between the discrete deviation levels $f_{24}$, $f_{23}$, etc. which respectively correspond to the higher amplitude ranges $r_{14}'$, $r_{13}'$, etc., there is a difference of $2f_L$ between the discrete deviation levels $f_0$, $f_2$, $f_4$, etc. which respectively correspond to the lower ranges $r_0'$, $r_1'$, $r_2'$, etc. By having an interval of $2f_L$ between the deviation levels produced by the lowest eleven amplitude ranges and by having an interval of $f_L$ between the remaining four amplitude ranges, all of the deviation levels $f_0$–$f_{24}$ are realized.

Figure 8:
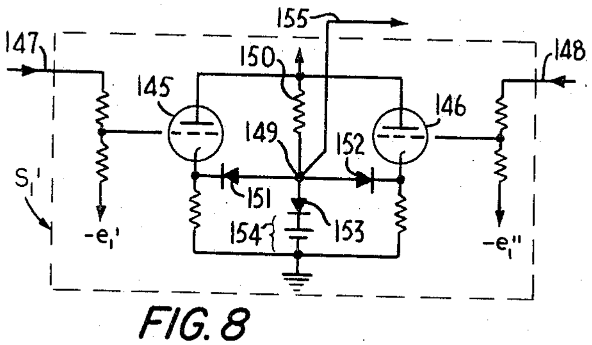
FIG. 8 is a schematic diagram of one of the switch circuits of the FIG. 7 stage.
Figure 9:
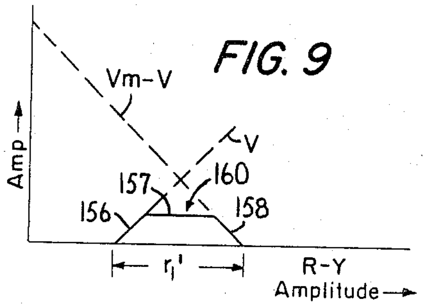
FIG. 9 is a graph illustrative of the operation of the FIG. 8 switch circuit.

Referring to FIG. 8, the switch $S_1'$ is comprised of a pair of cathode follower tubes 145, 146 of which 145 receives on its grid (by lead 147) the "V" or direct $R-Y$ signal, and of which tube 146 receives on its grid (by lead 148) the "$V_m$–V" or inverse $R-Y$ signal. The grid of tube 145 is biased by a negative voltage $e_1'$ to remain non-conducting until the direct $R-Y$ signal increases to the amplitude value characterizing the lower end of the amplitude range $r_1'$ (FIGS. 9 and 10). The grid of the tube 146 is biased by a negative voltage $e_1''$ to become non-conducting when the inverse $R-Y$ signal drops to the value produced by an increase in the direct $R-Y$ signal to the amplitude characterizing the upper end of the $r_1'$ range.

A junction 149 is connected through a high valued resistor 150 to plate voltage and through diodes 151, 152 to, respectively, the cathode of tube 145 and the cathode of tube 146. Another diode 153 is connected between junction 149 and ground and is reversely biased by a bias source 154. All three of the diodes are polarized to provide major current conduction in the direction away from junction 149. Therefore, the voltage at that junction will always approximate the least of the three voltages which the junction "sees," namely, the voltage at the cathode of tube 145, the voltage at the cathode of tube 146, and the biasing voltage provided by the source 154. A lead 155 supplies the voltage at junction 149 as the output of the switch $S_1'$.

In operation, as the direct $R-Y$ voltage increases and the inverse $R-Y$ voltage correspondingly decreases, the tube 146 is initially conductive, and the tube 145 is initially non-conductive. Hence, the voltage at junction 149 is locked to the voltage at the cathode of tube 145, i.e., is zero. When the amplitude value of the direct $R-Y$ signal reaches the lower end of the range $r_1'$, the tube 145 starts to conduct, and the voltage on its cathode thereafter rises in proportion to the rise in the direct $R-Y$ signal. Because that cathode voltage is still the lowest voltage seen by junction 149 through the diodes connected thereto, the junction voltage follows the cathode voltage to rise as indicated by the line 156 in FIG. 9.

Such rise in the junction voltage is terminated when the cathode voltage of tube 145 rises above that of the bias source 154. The voltage of such source then becomes the least voltage seen by the junction, wherefore the junction voltage levels off (line 157 in FIG. 9). Thereafter, the junction voltage follows the constant voltage source 154 until, because of a further rise in the direct $R-Y$ is signal is so biased that the cathode voltage of the tube 146 decreases enough to render the cathode voltage of that latter tube the least of the three voltages seen by junction 149. Thereupon, as the direct $R-Y$ signal continues to rise, the voltage on the cathode of tube 146 progressively drops to zero, and the junction voltage follows the cathode voltage down (line 158 of FIG. 9). Hence, over the amplitude range $r_1'$ for the input $R-Y$ signal, the switch $S_1'$ provides a trapezoidal output voltage 160 (FIG. 9).

The switch $S_0'$ has the same construction and operation as switch $S_1'$ excepting that the tube of $S_0'$ which receives the direct $R-Y$ signal is so biased that that cathode voltage of the tube is at least as great as the voltage provided by the reverse biasing source when the direct $R-Y$ signal has zero amplitude. The switch $S_{14}'$ has the same construction and operation as switch $S_1'$ excepting that the tube $S_{14}'$ which receives the inverse $R-Y$ signal i sso biased that the cathode voltage of the tube is at least as great as that provided by the reverse biasing source when the direct $R-Y$ signal has its maximum amplitude $V_m$.

Each of the fifteen switches of FIG. 7 supplies its trapezoidal voltage output to a respective one of fifteen normally non-conductive gates of which $G_0$, $G_1$ and $G_{14}$ are shown. Each of the fifteen gates is connected between, on the one hand, a respective one of fifteen crystal oscillators and, on the other hand, a common lead 170 for the separate modulation level signals which are the respective outputs of those oscillators. Thus, gate $G_0$ is in a signal channel for oscillator $O_0$, gate $G_1$ is in a signal channel for oscillator $O_1$ and so on, the gate $G_{14}$ being in the channel for the fifteenth oscillator $G_{14}$.

The signal from oscillator stage $O_0$ has a frequency of $f_0$, the signal from stage $O_1$ has a frequency of $f_2$, and the signal from stage $O_{14}$ has a frequency of $f_{24}$. As described, the successively lower frequencies of the signals from the first eleven oscillators are separated by intervals of $2f_L$, and the successively lower frequencies of the signals from the remaining four oscillators are spaced by intervals of $f_L$.

When the instantaneous amplitude of the input $R-Y$ signal comes within the range associated with a particular switch to actuate it, the switch output "opens" the corresponding gate to permit the signal from the corresponding oscillator to reach the common output lead 170. Thus, as the amplitude of $R-Y$ signal varies, different ones of the gates are actuated to cause signals of different ones of the frequencies $f_0$–$f_{24}$ to be impressed seriatim on the common lead 170. The succession of signals on the common lead provides the chrominance carrier which is modulated to discrete deviation levels in accordance with the numerically continuous variation in amplitude of the $R-Y$ signal. In order to avoid loss of the higher modulating frequencies, the rate at which the switches and gates can be actuated and deactuated is substantially higher (e.g., 2.5 megacycles) than the highest modulating frequency (0.5 megacycle) of the $R-Y$ signal.

The trapezoidal gating voltage from each switch produces a trapezoidal variation in the conductivity of the associated gate. Because of such trapezoidal variation, the frequency modulated carrier varies in frequency and strength on lead 170 in the manner indicated by lines 175–180 in FIG. 10. That is, if the amplitude of the $R-Y$ signal is in the middle of range $r_0'$, the carrier frequency is $f_0$ and the level of the carrier is indicated by the flat part of line 175. When the $R-Y$ amplitude increases to enter the region where ranges $r_0'$ and $r_1'$ overlap, the level of the signal at $f_0$ drops off, and a signal at frequency $f_2$ is developed and progressively rises in level. Within the overlap, therefore, the modulated carrier on lead 170 is comprised of two signals which differ in frequency and amplitude. The sum of the separate amplitudes of those two signals is, however, about the same as the amplitude of the single carrier signal produced to either side of the overlap. While a beat is produced by the difference in frequency between the two carrier component signals present in the overlap, such beat will be largely unnoticeable in the reproduced picture image.

When the $R-Y$ amplitude increases beyond the overlap of ranges $r_0'$ and $r_1'$, the modulated carrier is again provided by one signal, namely the signal of frequency $f_2$ from oscillator $O_1$. The manner in which the modulated carrier is produced with still further increase in $R-Y$ amplitude should be evident from the foregoing description.

An advantage in having the $R-Y$ amplitudes quantized into successive overlapping amplitudes and in producing the modulated carrier as depicted in FIG. 10 is that the $V_0$—$V_m$ amplitude range of the $R-Y$ signal contains no amplitude values which are discontinuous in the sense that they fail to produce the modulated carrier or fail to produce it at an appropriate level.

Figure 11:
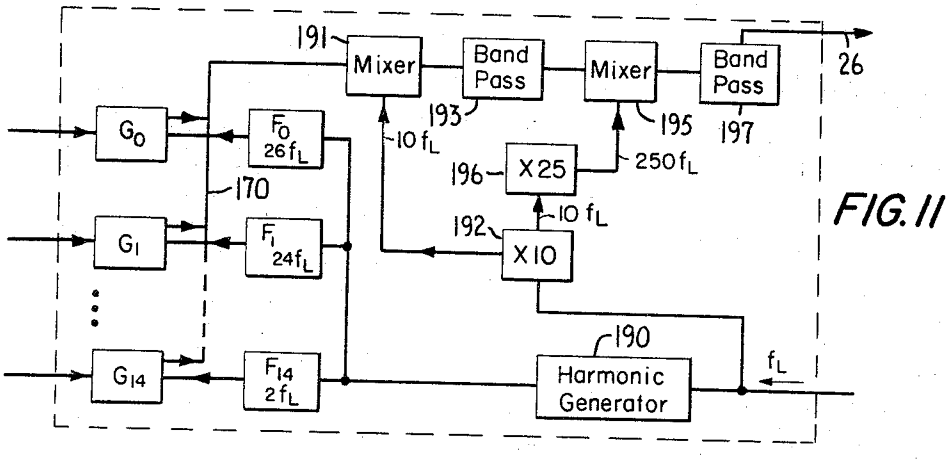
FIG. 11 is a block diagram of a modification of the stage of FIG. 7.

FIG. 11 shows a modification of the FIG. 7 circuit in which the fifteen oscillators have been replaced by means for generating the discrete carrier frequencies in a manner whereby each of those frequencies is positively locked in value with that of the horizontal line scan frequency $f_L$. Specifically, a signal at the frequency $f_L$ (from, say, unit 37) is fed to a stage 190 which generates harmonic signals having the frequency values $26f_L$ to $2f_L$. Selected ones of those harmonic signals are separated from each other by fifteen bandpass filters of which the filters $F_0$, $F_1$ and $F_{14}$ are shown. Filter $F_0$ passes the $26f_L$ signal, filter $F_1$ transmits the $24f_L$ signal, and filter $F_{14}$ transmits the $2f_L$ signal. As before, the successively lower signal frequencies passed by the first eleven filters are, starting with $26f_L$, separated by intervals of $2f_L$, and the successively lower signal frequencies passed by the remaining four filters are $5f_L$, $4f_L$, $3f_L$ and $2f_L$ so as to be separated by intervals of $f_L$. The harmonic signals so transmitted by the filters are modulation level signals.

The output of each of the fifteen filters is connected to common output lead 170 through a respective one of the fifteen gates of the FIG. 7 circuit. Therefore, the variation in amplitude of the input $R-Y$ signal causes the ones of the harmonic signals $26f_L \ldots 2f_L$ passed by the filters to be impressed seriatim on the lead 170 in the same way as the oscillator signals $f_0 \ldots f_{24}$ (FIG. 7) are impressed on that lead (FIG. 10).

The harmonic signal at any time present on lead 170 is supplied as one input to a mixer stage 191 which also receives an input of a signal of frequency $10f_L$ derived by tenfold multiplication in multiplier stage 92 of the input $f_L$ signal. The output of mixer stage 91 is comprised of the center frequency signal at $10f_L$, difference frequency signals and sum frequency signals. A bandpass filter 193 follows mixer 191 and passes the sum frequency signals but rejects the center frequency signal and the difference frequency signals.

The sum frequency signals at the output of filter 193 are fed to a mixer 195 which also receives an input of a signal at a frequency of $250f_L$ derived by multiplying twenty-five fold in multiplier stage 196 the $10f_L$ signal from multiplier stage 192. The output of mixer 196 consists as before of a center frequency signal, difference frequency signals and sum frequency signals. A bandpass filter 197 follows mixer 196 and rejects the center frequency signal and difference frequency signals but passes the sum frequency signals. Those sum frequency signals from filter 197 have the same respective frequency values $f_0, f_2 \ldots f_{24}$ as the oscillator signals impressed in FIG. 7 on the lead 170. Hence, the FIG. 10 modification is adapted like the FIG. 7 circuit to provide on output lead 26 a chrominance carrier which is frequency modulated (by the $R-Y$ signal) to discrete deviation levels in the manner indicated by FIG. 10.

In copending application Ser. No. 77,916 filed Dec. 23, 1960, and owned by the assignee hereof, there is disclosed a system in which a monochrome television video signal is effective to frequency modulate a carrier to produce a numerically continuous deviation thereof, the modulated carrier being recorded on film for subsequent reproduction therefrom of the video signal.

Figure 12A:
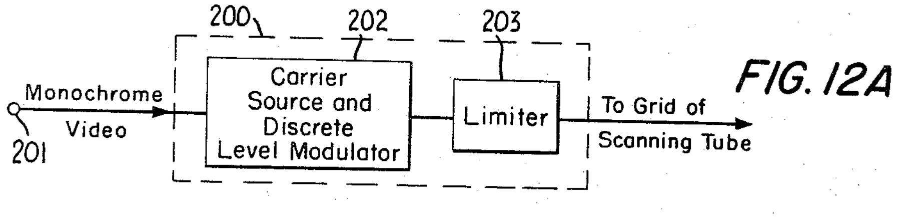
FIGS. 12A and 12B are block diagrams of modifications of, respectively, the recording section and the reproducing section of the FIG. 1 system.
Figure 12B:
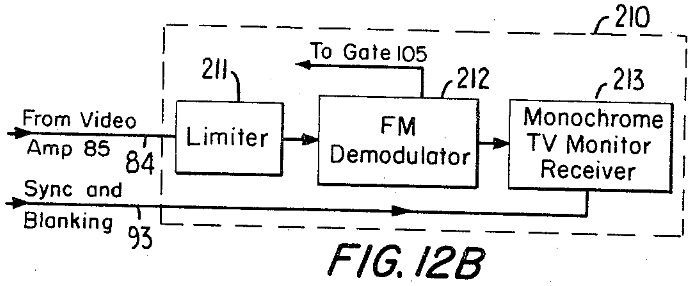

The system of FIG. 1 hereof may be modified as shown by FIGS. 12A and 12B to record and reproduce such a monochrome video signal in a manner whereby the numerically continuous variation in amplitude of the signal produces a frequency modulation of a carrier to discrete deviation levels. In accordance with the showing of FIG. 12A, the portion of the FIG. 1 system within dotted outline 200 is replaced by the combination of an input 201 for the monochrome video signal, a discrete level modulator 202 receiving the video signal as a modulating signal, and a limiter 203 following the stage 202. The output of limiter 203 is applied directly to the grid of tube 35 of FIG. 1. The limiter 203 may be similar to the previously described limiter 27. The discrete level modulator 202 may have a mode of operation similar to the unit 25 of FIG. 1, and such modulator 202 may be provided by any one of the circuits shown in FIGS. 5, 7 and 11 hereof.

In accordance with FIG. 12B, the portion of the FIG. 1 system within dotted outline 210 is replaced by a limiter 211 receiving the output from video amplifier 85 and feeling the stage 212. The limiter 211 and the FM demodulator stage 212 may be similar to, respectively, the limiter 91 and the FM demodulator stage 92 already described in connection with FIG. 1.

The above described embodiments being exemplary only, it is to be understood that additions thereto, omissions therefrom and modifications thereof can be made without departing from the spirit of the invention, and that the invention comprehends embodiments differing in form and/or detail from those which have been specifically described. Thus, for example, reference is made to the FIG. 5 circuit which quantizes the numerically continuous variation from $V_0$ to $V_m$ of the $R-Y$ signal into successive equal non-overlapping amplitude ranges and thereafter produces (at terminal 123) an amplitude variation in successive steps corresponding to those ranges. Such FIG. 5 circuit may be modified so that the proportional frequency modulator (elements 130–132) operates like the FIG. 7 circuit to cause the discrete deviation levels of the carrier to correspond to different size amplitude ranges of the modulating signal and/or to be separated from each other by frequency intervals of different size.

As another example, the FIG. 7 (or FIG. 11) circuit may be modified to provide an equal size for all the successive $R-Y$ amplitude ranges to which the switches respectively respond and/or to provide for equal frequency intervals between the discrete frequency values assumed by the carrier. Moreover, the FIG. 7 (or FIG. 11 circuit) may, as a separate feature, be modified to have switches which respectively respond to successive non-overlapping ranges of the $R-Y$ signal to provide "square" gating outputs of which the output voltage of any switch is constant over the $R-Y$ range associated with that switch. To eliminate a gap in the production of the modulated carrier as the $R-Y$ amplitude shifts from the range associated with one switch to the range associated with the adjacent switch, the switches are interconnected so that the deactuation of one produces actuation of the appropriate adjacent switch.

Accordingly, the invention is not to be considered as limited save as is consonant with the recitals of the following claims.

In the claims:

1. Recording apparatus comprising, signal transfer means, means to produce at a selected frequency a line by line transverse scanning by said means of a recording medium, source means of a carrier with a rest frequency which is an integral multiple of the line scan frequency, means responsive to an input signal having a numerically continuous variation to modulate a time characteristic of said carrier to different discrete levels of which each is produced by a respective one of successive ranges of said variation, and means to record said modulated carrier by said transfer means in scanned lines on said medium.

2. Apparatus as in claim 1 in which said discrete levels are separated by intervals which decrease in size in one direction of variation of said input signal.

3. Apparatus as in claim 1 in which there is an overlapping of ones of said successive ranges of variation of said input signal.

4. Apparatus as in claim 1 in which said source means comprises a source of said carrier at said rest frequency, and in which said means to modulate comprises, quantizing means to convert the continuous variation of said input signal into a step by step variation, and proportional modulating means to modulate said time characteristic of said carrier by the step values of the latter variation.

5. Apparatus as in claim 1 in which said source means comprises separate sources of modulation level signals having different respective time characteristics corresponding to said discrete levels and to the variation ranges associated therewith, and in which said means to modulate comprises, means responsive over said ranges to said input signal to transmit the modulation level signal corresponding to each range only when said input signal is within such range, and means to provide said modulated carrier from the transmitted signals.

6. Recording apparatus comprising, signal transfer means, means to produce at a selected frequency a line by line transverse scanning by said means of a recording medium, source means of a carrier with a rest frequency which is an integral multiple of the line scan frequency, means responsive to an input signal having a numerically continuous variation to frequency modulate said carrier to different discrete levels of deviation of which each is produced by a respective one of successive ranges of said variation, said discrete deviation levels being separated from each other by frequency intervals of which each equals said line scan frequency multiplied by an integer, and means to record said modulated carrier by said transfer means in scanned lines on said medium.

7. Apparatus as in claim 6 in which the rest frequency of the carrier is locked in synchronism with said line scan frequency.

8. Apparatus as in claim 7 in which the frequency of the modulated carrier at each of said discrete deviation levels is locked in synchronism with said line scan frequency.

9. Apparatus comprising, a cathode ray tube, means to pass a film strip past the front of said tube, means to produce at a selected frequency a line by line transverse scanning of said strip by the tube beam, source means of a carrier having a rest frequency which is an integral multiple of the line scan frequency, means responsive to an amplitude-varying video signal to modulate a time characteristic of said carrier to different discrete levels of which each is produced by a respective one of successive amplitude ranges of such video signal, and means to intensity modulate said beam by said modulated carrier to thereby record said modulated carrier in scanned lines on said strip.

10. Apparatus comprising, a cathode ray tube, means to pass a film strip past the front of said tube, means to produce at a selected frequency a line by line transverse scanning of said strip by the tube beam, source means of a carrier having a rest frequency which is an integral multiple of the line scan frequency, means responsive to an amplitude-varying video signal to frequency modulate said carrier to different discrete deviation levels of which each is produced by a respective one of successive amplitude ranges of said video signal, said levels being separated from each other by frequency intervals of which each equals said line scan frequency multiplied by an integer, and means to intensity modulate said beam by said modulated carrier to thereby record said modulated carrier in scanned lines on said strip.

11. Apparatus as in claim 10 in which said source means comprises a source of a carrier at said rest frequency, and in which said means to frequency modulate comprises, a quantizing circuit to convert the variation in amplitude of said video signal into a step by step amplitude variation, and a proportional modulating stage to frequency modulate said carrier in accordance with the amplitudes of the steps of the latter variation.

12. Apparatus as in claim 10 in which said source means comprises separate sources of modulation level signals having different constant frequencies corresponding to said deviation levels and to the associated ranges of said video signal, a plurality of signal-conduction channels of which each is connected to a respective one of said sources to receive the signal from that source, said channels being normally nonconductive, channel control means responsive to said video signal over said ranges to selectively actuate into signal-conduction the channel corresponding to each range only when video signal amplitude is within such range, and means connected to the outputs of said channels to provide said modulated carrier from the modulation level signals at said outputs.

13. Apparatus as in claim 12 in which said channel control means comprises a plurality of normally nonconductive gates of which each is connected in a respective one of said channels, and a plurality of switches of which each is connected to a respective one of said gates, each of said switches receiving an input of said video signal and being selectively responsive to a video signal amplitude within the range associated with the channel and gate corresponding to such switch to actuate such gate.

14. Apparatus as in claim 12 in which ones of said video signal amplitude ranges are overlapping, and in which said channel control means provides a trapezoidal signal-conductivity characteristic over each such overlapping range for the channel associated with that range.

15. Apparatus as in claim 12 in which said separate sources are comprised of a plurality of oscillator stages of which each provides a respective output of a modulation level signal having a constant frequency which is that of said carrier at a respective one of said discrete deviation levels, and in which said means connected to the outputs of said channels is a junction to which said outputs are commonly connected.

16. Apparatus as in claim 12 further comprising, a stage responsive to a signal having a frequency integrally related to and locked in synchronism with said line scan frequency to generate harmonics of the latter frequency, a plurality of filters connected to said stage to supply said harmonics as said modulation level signals to separate outputs providing said sources, and in which said means connected to the outputs of said channels comprises means to convert the harmonics from said channels into signals having different constant frequencies of which each is that of said carrier at a respective one of said discrete deviation levels, and means to utilize said last named signals as said modulated carrier.

17. Apparatus comprising, a cathode ray tube, means to pass a film strip by the front of said tube, means to produce at a selected frequency a line by line transverse scanning of said strip by the tube beam, source means of a carrier having a rest frequency which is an integral multiple of the line scan frequency, means responsive to an amplitude-varying video signal representing a chrominance characteristic of a picture image to frequency modulate said carrier to different discrete deviation levels of which each is produced by a respective one of successive amplitude ranges of said chrominance signal, means to combine said modulated carrier with a video signal representing the luminance of said picture image, and means to intensity modulate said beam by said combined signal to thereby record said combined signal in scanned lines on said strip.

18. Apparatus comprising, a cathode ray tube, means to pass a film strip by the front of said tube, means to produce at a selected frequency a line by line transverse scanning of said strip by the tube beam, source means of a carrier having a rest frequency which is an integral multiple of the line scan frequency, means responsive to a first video signal representing one of two chrominance components of a picture image to frequency modulate said carrier to different discrete deviation levels of which each is produced by a respective one of successive amplitude ranges of said first signal, means to limit said frequency modulated carrier, means to amplitude modulate said limited carrier by a second video signal representing the other of said chrominance components, means to thereafter combine said carrier with a third video signal representing the luminance of said image, and means to intensity modulate said beam by said combined signal to thereby record said combined signal in scanned lines on said strip.

19. An information record for the reproduction of information by scanning comprising, a longitudinally elongated record member, a plurality of parallel information-bearing strips disposed transversely across and spaced longitudinally seriatim along said member, and a plurality of multi-cycle variations provided by an information-yielding characteristic of said member and each being spatially distributed lengthwise over a respective one of said strips, the multi-cycle variations in separate ones of said strips being comprised of respective trains of single-cycle variations for which the strip distance on the member occupied by each cycle is constant within each train, and ones of said trains in different strips having the same value for said constant strip distance and being transversely disposed on said member to produce transverse registration of the longitudinally spaced cyclical variations respective to such trains and thereby to form separate series of spaced longitudinally extending, essentially parallel lines, whereby the separate trains of multicycle variations in each strip may be reproduced as respective constant frequency waveform segments by a beam sweeping transversely of the record medium.

20. An information record as in claim 19 in which different ones of said trains are characterized by respective constant strip distances on the medium per cycle of variation which are of different values for said different trains, but which are each equal to the same reference distance divided by an integer which is different for said different trains, whereby each of the series of lines yields when scanned a signal modulated in frequency to discrete levels corresponding to said constant strip distance associated with each train.

21. An information record as in claim 19 in which longitudinally consecutive ones of said strips have the same longitudinal dimension and are longitudinally separated by guard bands of which each has a longitudinal extent less than half said dimension.

22. An information record for the reproduction of information by scanning comprising, a longitudinally elongated record member in the form of a photographic film, a plurality of parallel information bearing strips disposed transversely across and spaced seriatim along said film, and a plurality of multi-cycle variations, characterizing the tone density of said film, and each being spatially distributed lengthwise over a respective one of said strips, the multi-cycle variations in separate ones of said strips being comprised of respective trains of single-cycle variations for which the strip distance on the medium occupied by each cycle is constant within each train, and ones of said trains in different strips having the same value for said constant strip distance and being transversely disposed on said member to produce transverse registration of the longitudinally spaced cyclical variations respective to such trains and to thereby form separate series of spaced longitudinally extending, essentially parallel lines, each of the series corresponding to the ones of said trains having the same value for said constant strip distance to yield when scanned a signal modulated in frequency to discrete levels corresponding to said constant strip distance associated with each train.

23. Apparatus comprising, a cathode ray tube, means to pass a film strip past the front of said tube, means to produce at a selected frequency a line by line scanning of said strip by the tube beam, sources of a video signal representing the luminance component of a picture image and of two video signals representing separate chrominance components of said image, said two chrominance signals each having a bandwidth of a value less than the bandwidth of said luminance signal, source means of a carrier, means to amplitude modulate said carrier by one of said chrominance signals, means to frequency modulate said carrier by the other of said chrominance signals, said carrier having a rest frequency which is an integral multiple of the line scan frequency and which is higher than the upper frequency value of said luminance bandwidth by a frequency interval greater than the sum of the maximum deviation of said carrier and the maximum frequency by which said carrier is modulated, means to combine said luminance signal and said amplitude and frequency modulated carrier, and means to intensity modulate said beam by said combined signal to thereby record said combined signal in scanned lines on said strip.

24. Apparatus for reproducing information by scanning, comprising the combination of;

an information record comprising a longitudinally elongated record member, a plurality of parallel information-bearing strips disposed transversely across and spaced longitudinally seriatim along the member, and a plurality of multi-cycle variations provided by an information-yielding characteristic of said member and each being spacially distributed lengthwise over a respective one of said strips, the multi-cycle variations in separate ones of said strips being comprised of respective trains of single-cycle variations for which the strip distance on the member occupied by each cycle is constant within each train, and ones of said trains in different strips having the same value for said constant strip distance and being transversely disposed on the member to produce longitudinal registration of the longitudinally spaced cyclical variations respective to such trains;

means for transporting the information record in the direction of elongation through a scanning zone; and means for scanning the information strips seriatim to develop a cyclically varying electrical signal representative of the multi-cycle variations in each of the strips, the frequency of the cyclically varying signal being related to the number of multi-cycle variations scanned in a given transverse distance across the strip.

25. Apparatus as set forth in claim 24, in which the information to be reproduced is color video information, and in which each train of single cycle variations in the strips represents a discrete frequency level of a frequency modulated color carrier signal modulated according to color information in a corresponding strip of the original scene, the apparatus further comprising:

frequency demodulation means for recovering the color information represented by the cyclic variations of the respective trains in said strips.

26. An information record as in claim 19, further comprising a second record provided by said information yielding characteristic of the member in separate ones of the strips and constituting amplitude modulation of said multicycle variations in accordance with a component of the information to be reproduced.

27. An information record as defined in claim 26, in which the strip distance occupied by each cycle of the plurality of multi-cycle variations varies in accordance with a chrominance signal representing color information contained in a corresponding strip of the original scene to be reproduced.

28. An information record as defined in claim 27, in which the amplitude modulating component varies in accordance with a second chrominance signal representing a different component of color information contained in a corresponding strip of the original.

29. Apparatus as set forth in claim 24, in which:

different ones of the trains of multicycle variations are characterized by respective constant strip distances on the medium per cycle of variation which are of different values for the different trains, but which are each equal to the same reference distance divided by an integer which is different for the different trains.

30. Apparatus in accordance with claim 24, in which:

longitudinally consecutive ones of the strips on the record medium have the same longitudinal dimension and are longitudinally separated by guard bands of which each has a longitudinal extent less than half of said dimension.

31. Apparatus in accordance with claim 24, in which the record medium further comprises:

a second record having a variable parameter provided by said information yielding characteristic of the member in separate ones of the strips and constituting amplitude modulation of said multicycle variations in accordance with a component of the information to be reproduced.

32. Apparatus in accordance with claim 24, in which:

the strip distance occupied by each cycle of the plurality of multicycle variations varies in accordance with a chrominance signal representing color information contained in a corresponding strip of the original strip to be reproduced.

References Cited

UNITED STATES PATENTS

| | | | |
|---|---|---|---|
| 2,036,869 | 4/1936 | Hammond | 178—6.7 |
| 3,137,768 | 6/1964 | Mullin | 178—6.6 |

FOREIGN PATENTS

| | | |
|---|---|---|
| 952,607 | 3/1964 | Great Britain. |

JOHN W. CALDWELL, *Primary Examiner.*

DAVID G. REDINBAUGH, *Examiner.*

J. A. O'BRIEN, *Assistant Examiner.*